United States Patent [19]

Schläfer

[11] Patent Number: 5,175,263
[45] Date of Patent: Dec. 29, 1992

[54] WATER-SOLUBLE AZO COMPOUNDS, HAVING A FIBER-REACTIVE GROUP OF THE VINYLSULFONE SERIES IN THE DIAZO COMPONENT AND HAVING A PHENOXY- OR ARALKYLOXY-SUBSTITUTED CHLORO-S-TRIAZINYLAMINO-NAPHTHOL SULFONIC ACID COUPLING COMPONENT, SUITABLE AS DYESTUFFS

[75] Inventor: Ludwig Schläfer, Kelkheim, Fed. Rep. of Germany

[73] Assignee: Hoechst Aktiengesellschaft, Frankfurt am Main, Fed. Rep. of Germany

[21] Appl. No.: 655,306

[22] Filed: Feb. 14, 1991

Related U.S. Application Data

[63] Continuation of Ser. No. 481,887, Feb. 20, 1990, abandoned.

[30] Foreign Application Priority Data

Feb. 22, 1989 [DE] Fed. Rep. of Germany ....... 3905403

[51] Int. Cl.⁵ ............... C09B 62/51; C09B 62/085; D06P 1/38
[52] U.S. Cl. ................................. 534/638; 534/632
[58] Field of Search ........................ 534/632, 638

[56] References Cited

U.S. PATENT DOCUMENTS

| 4,649,193 | 3/1987 | Meininger et al. | 534/638 X |
| 4,713,082 | 12/1987 | Scheibli et al. | 534/638 X |
| 4,725,675 | 2/1988 | Meininger et al. | 534/638 |

FOREIGN PATENT DOCUMENTS 17696  2/1979  Switzerland .......... 534/638

*Primary Examiner*—Mary C. Lee
*Assistant Examiner*—Fiona T. Powers
*Attorney, Agent, or Firm*—Connolly and Hutz

[57] ABSTRACT

Azo compounds with fiber-reactive dye properties, having defined general formula (1) below, are described which dye fiber materials containing hydroxy and/or carboxamide groups, such as synthetic polyamide fibers or wool, and especially cellulose fiber materials such as cotton, in strong, fast, predominantly red shades.

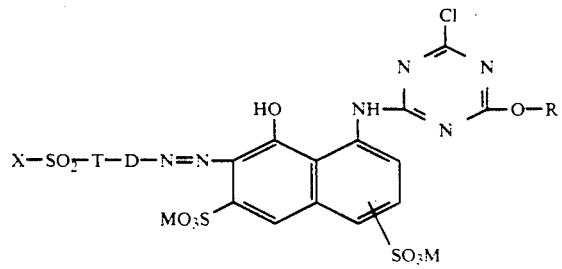

in which:

X is vinyl or β-sulfatoethyl;

T is a direct bond or the methylene or divalent methyl amino group;

D is phenylene which is unsubstituted or substituted by lower alkyl, lower alkoxy, chlorine, bromine, sulfo and/or carboxy, or is an unsubstituted or sulfo-substituted naphthylene or a group of the formula

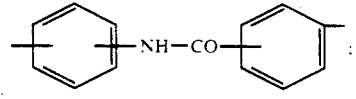

R is phenyl which is unsubstituted or substituted by hydroxy lower alkyl, lower alkoxy, carboxy and/or sulfo, or is a lower alkyl substituted by unsubstituted or sulfo-substituted phenyl or by unsubstituted or sulfo-substituted naphthyl; and M is a hydrogen atom or an alkali metal.

11 Claims, No Drawings

WATER-SOLUBLE AZO COMPOUNDS, HAVING A FIBER-REACTIVE GROUP OF THE VINYLSULFONE SERIES IN THE DIAZO COMPONENT AND HAVING A PHENOXY- OR ARALKYLOXY-SUBSTITUTED CHLORO-S-TRIAZINYLAMINO-NAPHTHOL SULFONIC ACID COUPLING COMPONENT, SUITABLE AS DYESTUFFS

This is a Continuation application of U.S. application Ser. No. 07/481,887, filed on Feb. 20, 1990, now abandoned.

The invention relates to the technical area of fiber-reactive dyes.

Example 1 of U.S. Pat. No. 4,725,675 discloses an azo dye which contains, as coupling component, 1-amino-8-naphthol-3,6-disulfonic acid with a 2-chloro-4-(3'-sulfophenyl)amino-1,3,5-triazin-6-yl group bonded to its amino group, and in which the diazo component is the 4-(β-sulfatoethylsulfonyl)phenyl group. However, when used in the exhaust process at different dyeing temperatures, this known dye gives very variable dye yields and the dyeings which can be obtained therewith possess only a very low fastness to chlorine. Furthermore, it is unsuitable for use in the cold pad-batch dyeing process.

Czechoslovakian patent n° 176 961 discloses azo dyes of similar structure, except that the diazo component is a sulfoaniline and the chlorotriazine radical of the coupling component contains a phenoxy group in the 4-position instead of the 3,-sulfophenylamino group. These known dyes do not have a high degree of fixation, so contamination of the effluent by unfixed dye is very high.

The present invention now provides novel fiber-reactive monoazo compounds with very good dye properties, which surprisingly do not possess the abovementioned disadvantages. The monoazo compounds according to the invention conform to the general formula (1)

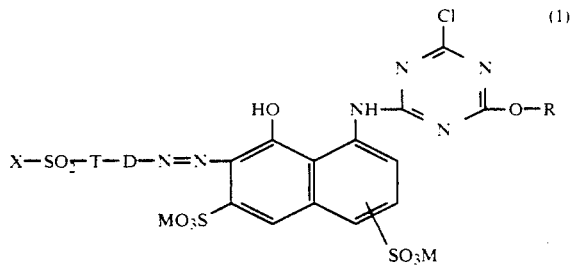

in which:

X is the vinyl group or a β-sulfatoethyl group;

T is a direct bond, the methylene group or the divalent methylamino group of the formula

D is a phenylene radical which can be substituted by 1 or 2 substituents from the group comprising alkyl having 1 to 4 carbon atoms, such as ethyl and especially methyl, alkoxy having 1 to 4 carbon atoms, such as ethoxy and especially methoxy, chlorine, bromine, sulfo and carboxy, or is a naphthylene radical which can be substituted by a sulfo group, or is a radical of general formula (2)

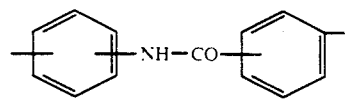

in which the carbonyl group is preferably bonded to the benzene ring in the meta or para position relative to the free bond joined to the azo group;

R is a phenyl radical which can be substituted by 1 or 2 substituents from the group comprising hydroxy, alkyl having to 4 carbon atoms, such as ethyl and especially methyl, alkoxy having 1 to 4 carbon atoms, such as ethoxy and especially methoxy, carboxy and sulfo, or an alkyl radical having 1 to 4 carbon atoms which is substituted by a phenyl radical or a naphthyl radical, such as the benzyl or phenethyl radical, it also being possible for the phenyl and naphthyl radicals to be substituted by 1 or 2 sulfo groups;

M is a hydrogen atom or an alkali metal such as sodium, potassium or lithium; and one of the groups —SO₃M is bonded to the ring of the naphthol radical in the meta or para position relative to the amino group.

The "sulfo", "carboxy" and "sulfato" groups include their salt form as well as their acid form. Accordingly, sulfo groups are groups of the general formula —SO₃M, carboxy groups are groups of the general formula —COOM and sulfato groups are groups of the general formula —OSO₃M, M being in each case as defined above.

The azo compounds of general formula (1) according to the invention can be in the acid form or in the form of their salts. Preferably in the form of the alkali metal salts, they are used for the dyeing (including printing) of fiber materials containing hydroxy groups and/or carboxamide groups.

Preferred azo compounds according to the invention are those in which X is the β-sulfatoethyl group, those in which T is a direct covalent bond and also those in which D is the metaphenylene or paraphenylene radical or the 1-sulfo-2,6-naphthylene radical with the azo group bonded to its 2-position. Other preferred azo compounds according to the invention are those in which one of the sulfo groups is bonded to the ring of the naphthalene radical of the naphthol coupling component in the meta position relative to the amino group.

Furthermore, the group R in the compounds of general formula (1) is preferably the 2-methylphenyl, 3-methylphenyl, 4-methylphenyl, 3-hydroxyphenyl, 2-carboxyphenyl, benzyl or 4-carboxybenzyl group and most preferably the phenyl group.

The present invention further relates to processes for the preparation of the novel azo compounds of general formula (1), which comprise coupling the diazonium compound of an amine of general formula (3)

$$X-SO_2-T-D-NH_2 \qquad (3)$$

in which X, T, and D are as defined above, with a compound of general formula (4)

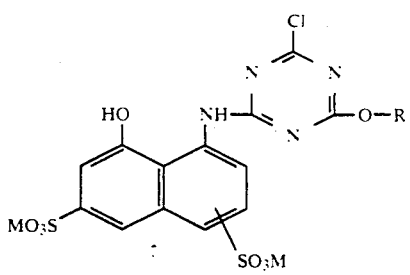

in which M and R are as defined above, or reacting a compound of general formula (5)

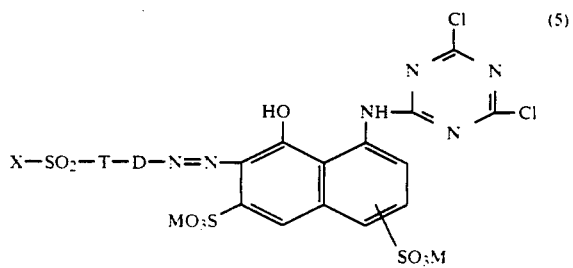

in which X, T, D and M are as defined above, with a compound of the general formula H—O—R, where R is as defined above, or reacting an azo compound of general formula (6)

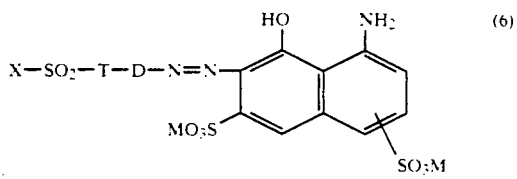

in which X, T, D and M are as defined above, with a compound of general formula (7)

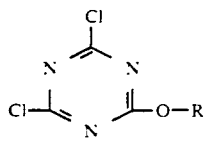

in which R is as defined above.

The diazotization and coupling reactions are carried out in the well-known and conventional manner, i.e. the diazotization is normally carried out at a temperature of between $-5°$ C. and $+15°$ C. and a pH below 2 by means of a strong acid and an alkali metal nitrite, in a preferably aqueous medium, and the coupling reaction is normally carried out at a pH of between 3 and 7.5, preferably of between 4 and 7, and at a temperature of between 0° and 30° C., preferably of between 10° and 25° C., in an aqueous medium.

The reaction according to the invention of an azo compound of general formula (5) with the compound containing a hydroxy group of the general formula H—O—R, where R is as defined above, is carried out in an aqueous or aqueous-organic medium at a temperature of between 0° and 50° C., preferably of between 20° and 30° C., and a pH of between 5 and 9, preferably of between 7 and 8.

The reaction according to the invention of an azo compound of general formula (6) with a dichlorotriazine compound of general formula (7) is also carried out in an aqueous or aqueous-organic medium at a temperature of between 0° and 30° C., preferably of between 10° and 20° C., and a pH of between 5 and 8, preferably of between 6 and 7.

If the abovementioned reactions according to the invention are carried out in an aqueous-organic medium, the organic solvent therein is, for example, acetone, dioxane, dimethylformamide or toluene.

Numerous amines of general formula (3) are described in the literature, examples of such compounds being 4-($\beta$-sulfatoethylsulfonyl)aniline, 4-vinylsulfonylaniline, 3-($\beta$-sulfatoethylsulfonyl)aniline, 3-vinylsulfonylaniline, 2-methoxy-5-($\beta$-sulfatoethylsulfonyl)aniline, 2-methoxy-5-methyl-4-($\beta$-sulfatoethylsulfonyl)aniline, 2,5-dimethoxy-4-($\beta$-sulfatoethylsulfonyl)aniline, 2-chloro-5-($\beta$-sulfatoethylsulfonyl)aniline, 3+-($\beta$-sulfatoethylsulfonyl)-4-aminobenzanilide, 2-sulfo-4-($\beta$-sulfatoethylsulfonyl)aniline, 2-sulfo-5-($\beta$-sulfatoethylsulfonyl)aniline, 2-methoxy-4-($\beta$-sulfatoethylsulfonyl)aniline, 4-methoxy-5-($\beta$-sulfatoethylsulfonyl)aniline, 4-($\beta$-sulfatoethylsulfonyl)-1-aminonaphthalene, 5-($\beta$-sulfatoethylsulfonyl)-2-aminonaphthalene, 6-($\beta$-sulfatoethylsulfonyl)-2-aminonaphthalene, 8-($\beta$-sulfatoethylsulfonyl)-2-aminonapthalene, 5-($\beta$-sulfatoethylsulfonyl)-2-aminonaphthalene-1-sulfonic acid, 6-($\beta$-sulfatoethylsulfonyl)-2-aminonaphthalene-1-sulfonic acid, 6-($\beta$-sulfatoethylsulfonyl)-2-aminonaphthalene-8-sulfonic acid, 8-($\beta$-sulfatoethylsulfonyl)-2-aminonaphthalene-6-sulfonic acid, 4-[N-methyl-N-($\beta$-sulfatoethylsulfonyl)]aminoaniline, 3-[N-methyl-N-($\beta$-sulfatoethylsulfonyl)]aminoaniline, 4-($\beta$-sulfatoethylsulfonylmethyl)aniline and 3-($\beta$-sulfatoethylsulfonylmethyl)aniline.

Examples of starting compounds of the general formula H—O—R are phenol, cresols, resorcinol, salicylic acid, benzyl alcohol and hydroxymethylbenzoic acid.

The starting compounds of general formulae (3), (4), (5) and (6) are known from the literature and can be prepared, analogously to the procedures indicated therein, by diazotization and coupling of the appropriate diazo and coupling components or, in the case of the compounds of general formula (4), by reaction of 1-amino-8-naphthol-3,6- or -4,6-disulfonic acid with a compound of general formula (7), for example analogously to the procedure whereby the aminoazo compounds of general formula (6) are reacted with a compound of general formula (7). The starting compounds of general formula (7) are obtained analogously by reaction of cyanuric chloride (2,4,6-trichloro-1,3,5-triazine) with a compound of the general formula H—O—R, where R is as defined above, in an aqueous or, preferably, aqueous-organic medium at a temperature of between 30° and 60° C., preferably of between 40° and 50° C., and a pH of between 4 and 7, preferably of between 5 and 6.

The compounds of general formula (1) prepared according to the invention can be separated and isolated from their synthesis solutions by commonly known methods, for example by salting-out or evaporation of the solutions.

On account of their good fiber-reactive properties and valuable dye properties, the compounds of formula (1) according to the invention are suitable for the dyeing (including printing) of natural, regenerated or synthetic materials containing hydroxy groups and/or carboxamide groups, for example in the form of textile fabrics, but especially cellulose fiber materials The solutions obtained in the synthesis of the compounds (1) can also be used direct as liquid preparations for dyeing, if appropriate after adjustment to a particular dye concentration and if appropriate after the addition of a buffer substance.

The present invention therefore further relates to the use of the compounds of formula (1) for the dyeing (including printing) of materials containing hydroxy and/or carboxamide groups, preferably fiber materials, and to a process for the dyeing (including printing) of these materials using the application and fixation techniques known for fiber-reactive dyes, for example by applying a compound of formula (1) in dissolved form to the substrate, or incorporating it into the substrate, and fixing it by the action of heat, by the action of an agent giving an alkaline reaction, or by both these means. A large number of such dyeing techniques are described in the literature, for example in German Offenlegungsschrift 3 025 572.

The monoazo compounds of general formula (1) according to the invention have a good solubility in water and exhibit a good build-up of color. They are easy to handle and, when used in the same amounts on a particular quantity of fiber material of the same type, they produce the same depths of color, irrespective of whether they are used for dyeing by the exhaust process at 40° C., 60° C. or 80° C. or even by the cold pad-batch process at 15° to 25° C. The degree of fixation of the monoazo compounds according to the invention is very high, so when the dyeings are finished, only small proportions of the dyes are discharged into the rinse or wash water.

Printing pastes, padding liquors and dyebaths have a high stability Dyeings and prints, especially on cellulose fiber materials, possess good general use and production fastness properties, for example a very good fastness to light both when dry and when moistened with drinking water or with a sweat solution. Furthermore, the dyeings and prints according to the invention are distinguished by a good fastness to chlorine, for example a good fastness to chlorinated swimming-pool water, and also by a good fastness to alkaline and acid sweat, a good fastness to acid, alkali and cross-dyeing, a good fastness to washing and a high acid storage stability The prints have sharp contours and a clear white background; they do not bleed on to other material present.

The following Examples will serve to illustrate the invention. Parts and percentages are by weight, unless indicated otherwise Parts by weight are to parts by volume as kilograms are to liters.

The compounds described by way of formulae in these Examples are given in the form of the free acids; they are generally prepared and isolated in the form of their alkali metal salts, such as lithium, sodium or potassium salts, and used in the form of their salts for dyeing. Likewise, the starting compounds and components given in the form of the free acid in the following Examples, especially tabulated Examples, can be used in the synthesis either as such or in the form of their salts, preferably alkali metal salts.

The absorption maxima ($\lambda_{max}$) in the visible region given for the compounds according to the invention were determined using their alkali metal salts in aqueous solution. In the tabulated Examples, the $\lambda_{max}$ values are given in brackets after the shade; the wavelength data are in nm.

EXAMPLE 1

(a) An aqueous solution of 52 parts of phenol and 50 parts by volume of a 33% aqueous solution of sodium hydroxide in 250 parts of water is treated, at a temperature of between 30° and 35° C., with a solution of 92.5 parts of cyanuric chloride in 700 parts by volume of toluene, with thorough stirring. The reaction mixture is heated to 50° C. and stirred for a further 1 hour at this temperature. The organic phase is separated off and dried with magnesium sulfate and the bulk of the toluene is distilled off. The distillation residue is filtered off with strong suction and washed with twice 20 parts by volume of toluene. After drying under reduced pressure at 30° C., 80 parts of the compound 2,4-dichloro-6-phenoxy-1,3,5-triazine melting at 111 to 116° C. are obtained.

(b) 24 parts of 2,4-dichloro-6-phenoxy-1,3,5-triazine are added over 60 minutes, at a temperature of about 18° C., to a solution of 31.9 parts of 1-amino-8-naphthol-3,6-disulfonic acid in 200 parts of water, with thorough stirring, the pH being kept at 6 using a 3N aqueous solution of lithium hydroxide. The reaction mixture is stirred for a further 3 to 4 hours until aminonaphthol can no longer be detected by thin layer chromatography.

(c) An aqueous solution, containing hydrochloric acid, of a conventionally prepared diazonium salt of 28.1 parts of 4-($\beta$-sulfatoethylsulfonyl)aniline is added to the solution of 1-(4'-chloro-6'-phenoxy-1',3',5'-triazin-2'-yl)amino-3,6-disulfo-8-naphthol prepared under b) and the coupling reaction is carried out at 15° to 25° C. and a pH of between 4 and 5. The solution is then clarified by means of 15 parts of activated charcoal and filtration and the filtrate is evaporated under reduced pressure at 80° C.

This gives a dark red powder, containing electrolyte, of the alkali metal salt (sodium salt) of the compound of the formula

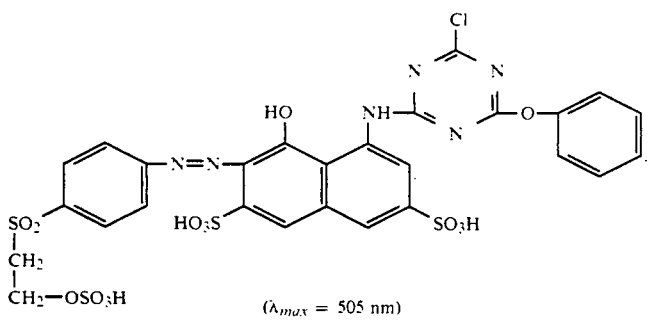

($\lambda_{max}$ = 505 nm)

This azo compound according to the invention has very advantageous fiber-reactive dye properties and, in the dyeing and printing processes conventionally used in industry for fiber-reactive dyes, on the materials mentioned in the description. especially on cellulose fiber materials, produces intense red dyeings and prints with good fastness properties, of which the good fastness to washing, the good fastness to light both when dry and when moistened with drinking water or a sweat solution, and the good fastness to sweat and chlorine, may be specially emphasized. In particular, the azo compound according to the invention produces equally high color strengths when used in the exhaust process at temperatures of between 40° and 80° C. and when used in the cold pad-batch process. The azo compound according to the invention possesses a very high degree of fixation and a very good build-up of color. The prints which can be obtained therewith have a clear white background and do not stain other fabric present.

EXAMPLE 2

20.3 parts of cyanuric chloride are added at 0° C. to a solution of 9.4 parts of phenol and 5 parts by volume of a 33% aqueous solution of sodium hydroxide in 100 parts of water. The mixture is stirred for one hour at 0° to 5° C. and a pH of 9 to 10, 28.7 parts of 1-amino-8-naphthol-3,6-disulfonic acid are then added and stirring is continued at a temperature of between 20° and 30° C. and a pH of between 6 and 7 until the aminonaphtholsulfonic acid has completely reacted. An aqueous solution, containing hydrochloric acid, of the diazonium salt of 25.3 parts of 4-($\beta$-sulfatoethylsulfonyl)aniline is then added and the coupling reaction is carried out at a pH of 4 to 5 and at 15° to 20° C.

The synthesis solution is clarified and the azo compound according to the invention of the structure given in Example 1 is isolated as the alkali metal salt, for example by evaporation of the solution or spray-drying. The azo compound according to the invention is identical with that of Example 1 and accordingly possesses the same good dye properties.

EXAMPLE 3

The coupling component prepared according to Example 1b), in the aqueous synthesis solution, is treated with an aqueous solution, containing hydrochloric acid, of the diazonium salt of 38.7 parts of 6-($\beta$-sulfatoethylsulfonyl)-1-sulfo-2-aminonaphthalene and the coupling reaction is carried out at a temperature of between 15° and 20° C. and a pH of between 4 and 5. The synthesized azo compound according to the invention is isolated in the form of its alkali metal salt by the conventional procedure. Written in the form of the free acid, it has the formula

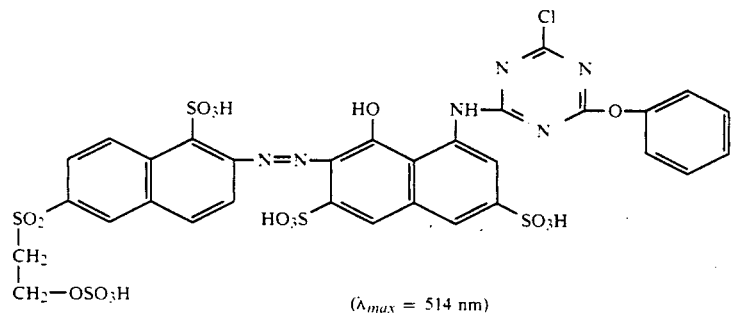

($\lambda_{max}$ = 514 nm)

and has very good fiber-reactive dye properties. On the materials mentioned in the description, for example cotton, it produces deep bluish-red dyeings and prints with good fastness properties, for example a good fastness to washing, sweat, chlorine and light. The color strength of the dyeings obtained is largely independent of the dyeing temperature; the fixation rate is very high.

EXAMPLE 4

A solution of 27.6 parts of salicylic acid in a mixture of 100 parts of water and 36 parts by volume of concentrated aqueous sodium hydroxide solution is added to a solution of 28.9 parts of cyanuric chloride in 300 parts by volume of toluene, with stirring. The temperature rises to 45° to 50° C. during the addition. The mixture is stirred for a further one hour at this temperature and then cooled, the organic phase is separated off, the aqueous phase is acidified and residual organic substance is extracted therefrom with toluene. The toluene solutions are combined, the organic phase is dried and the toluene is distilled off. The distillation residue, which no longer contains starting material, is added over one hour, at 20° to 25° C., to a neutral solution of 57.4 parts of 1-amino-8-naphthol-3,6-disulfonic acid in 300 parts of water, with thorough stirring, the pH being kept at 6 to 6.5. The mixture is stirred for a further 6 to 8 hours until the reaction is complete; it is then treated with an aqueous solution, containing hydrochloric acid, of the diazonium salt of 50.6 parts of 3-(β-sulfatoethyl-

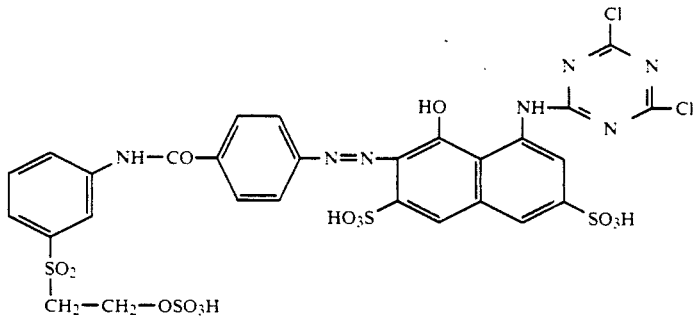

sulfonyl)aniline. The coupling reaction is carried out at about 20° C. and a pH of 5.

The solution of the resulting monoazo compound according to the invention is clarified and the compound according to the invention is isolated by evaporation or spray-drying.

This gives a reddish-brown powder, containing salt, of the alkali metal salt of the compound of the formula

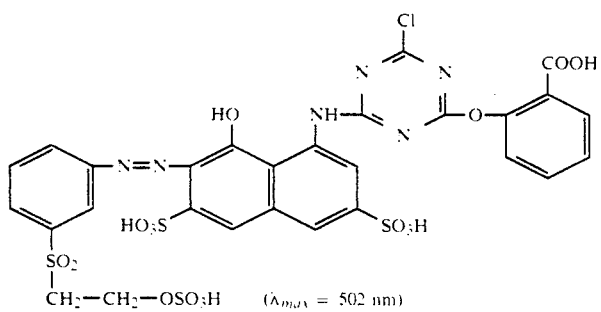

($\lambda_{max}$ = 502 nm)

which possesses very good fiber-reactive dye properties and dyes cellulose fiber materials, for example, in intense red shades with good fastness properties such as those mentioned for the azo compound according to the invention of Example 1. It possesses a very high degree of fixation and a very good build-up of color; the dyeings which can be obtained both by the exhaust process at temperatures of between 40° and 80° C. and by the cold pad-batch process, using the same amounts of the monoazo compound according to the invention, have the same color strengths. Furthermore, the prints which can be obtained therewith have a clear white background and do not stain other fabric present.

EXAMPLE 5

87.8 parts of the azo compound of the formula obtainable in conventional manner by means of a coupling reaction of the diazonium salt of 4-amino-3'-(β-sulfatoethylsulfonyl)benzanilide with 1-(2',4'-dichloro-s-triazin-6,-yl)amino-3,6-disulfo-8-naphthol, are suspended as an alkali metal salt in 600 parts of water. 9.4 parts of phenol are added, the pH is adjusted to 8 with a 10% aqueous solution of sodium hydroxide and the reaction is brought to completion over 2 hours, at a temperature of 25° to 30° C., the pH being kept at 8. The pH is then adjusted to 4 to 5 and the azo compound according to the invention is salted out as the sodium salt by means of sodium chloride.

Written in the form of the free acid, it has the formula

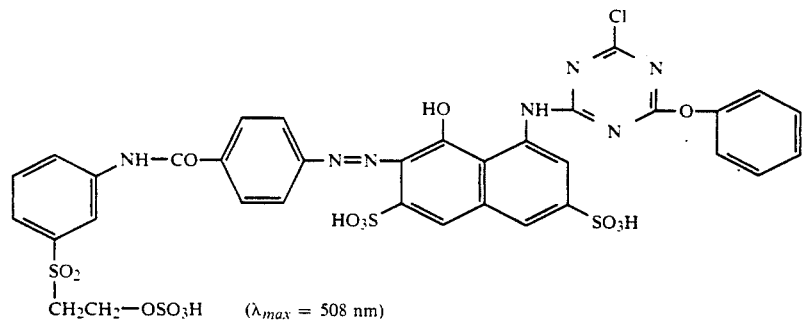

($\lambda_{max}$ = 508 nm)

and exhibits very good fiber-reactive dye properties. In the application and fixation processes conventionally used for fiber-reactive dyes, it produces, for example on cellulose fiber materials, intense bluish-red dyeings and prints with good fastness properties such as those mentioned for the azo compound according to the invention of Example 1. The dyeings which can be obtained both by the exhaust process at temperatures of between 40° and 80° C. and by the cold pad-batch process, using the same amounts of the monoazo compound according to the invention, have the same color strengths Furthermore, the prints which can be obtained therewith possess a clear white background and do not stain other fabric present.

EXAMPLES 6 TO 88

In the following tabulated Examples, further monoazo compounds according to the invention of general formula (A) written in the form of the free acid

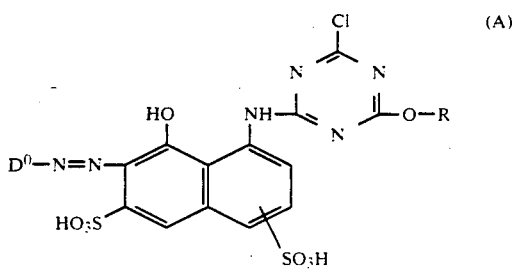

are described with the aid of the formula radicals given in the Tables, one of the sulfo groups —SO₃H being bonded to the aminonaphthol coupling component in the 3-position or 4-position of the naphthalene ring (the amino group joined to the chlorotriazine radical is located in the 1-position). They can be prepared in a manner according to the invention, for example analogously to one of the above Examples of embodiment, from the starting components to be found in the appropriate tabulated Example in conjunction with formula (A). They possess the good dye properties mentioned in the description and produce, on the materials given, especially cellulose fiber materials, in the application processes conventionally used for fiber-reactive dyes, intensely colored dyeings and prints in the shade indicated in the appropriate tabulated Example for dyeing on cotton.

| Ex. | Radical D | —SO₃H group in ... - position | Radical R | Shade |
|---|---|---|---|---|
| 6 | 4-vinylsulfonylphenyl | 3- | phenyl | red (504) |
| 7 | 3-vinylsulfonylphenyl | 3- | phenyl | red (502) |
| 8 | 4-vinylsulfonylphenyl | 4- | phenyl | red (493) |
| 9 | 3-vinylsulfonylphenyl | 4- | phenyl | red (484) |
| 10 | 3-(β-sulfatoethyl-sulfonyl)phenyl | 4- | phenyl | red (502) |
| 11 | 4-(β-sulfatoethyl-sulfonyl)phenyl | 4- | phenyl | red (504) |
| 12 | 4-(β-sulfatoethyl-sulfonyl)phenyl | 3- | 4-chloro-benzyl | red (505) |
| 13 | 2-methoxy-5-(β-sulfatoethylsulfonyl)-phenyl | 3- | phenyl | red (510) |
| 14 | 2-methoxy-5-(β-sulfatoethylsulfonyl)-phenyl | 4- | phenyl | red (503) |
| 15 | 4-methoxy-3-(β-sulfatoethylsulfonyl)-phenyl | 3- | phenyl | red |
| 16 | 2-methoxy-4-(β-sulfatoethylsulfonyl)-phenyl | 3- | phenyl | red |
| 17 | 2-chloro-5-(β-sulfato-ethylsulfonyl)phenyl | 3- | phenyl | red |
| 18 | 2-methoxy-5-methyl-4-(β-sulfatoethyl-sulfonyl)phenyl | 3- | phenyl | bluish-red (514) |
| 19 | 2,5-dimethoxy-4-(β-sulfatoethylsulfonyl)-phenyl | 3- | phenyl | bluish-red (520) |
| 20 | 2-bromo-4-(β-sulfato-ethylsulfonyl)phenyl | 3- | phenyl | red (506) |
| 21 | 2-sulfo-4-(β-sulfato-ethylsulfonyl)phenyl | 3- | phenyl | red (507) |
| 22 | 2-sulfo-5-(β-sulfato-ethylsulfonyl)phenyl | 3- | phenyl | red |
| 23 | 4-(β-sulfatoethyl-sulfonyl)naphth-1-yl | 3- | phenyl | red |
| 24 | 6-(β-sulfatoethyl-sulfonyl)naphth-2-yl | 3- | phenyl | red |
| 25 | 8-(β-sulfatoethyl-sulfonyl)naphth-2-yl | 3- | phenyl | red |
| 26 | 1-sulfo-6-(β-sulfato-ethylsulfonyl-)naphth-2-yl | 4- | phenyl | red (503) |
| 27 | 6-sulfo-8-(β-sulfato-ethylsulfonyl)naphth-2-yl | 3- | phenyl | red (510) |
| 28 | 8-sulfo-6-(β-sulfato-ethylsulfonyl)naphth-2-yl | 4- | phenyl | red |
| 29 | 2-sulfo-4-vinyl-sulfonylphenyl | 3- | phenyl | red |
| 30 | 2-sulfo-5-vinyl-sulfonylphenyl | 3- | phenyl | red (503) |
| 31 | 1-sulfo-6-vinyl-sulfonylnaphth-2-yl | 3- | phenyl | bluish-red (513) |
| 32 | 6-sulfo-8-vinyl-sulfonylnaphth-2-yl | 3- | phenyl | bluish-red (517) |
| 33 | 8-sulfo-6-vinyl-sulfonylnaphth-2-yl | 3- | phenyl | bluish-red |
| 34 | 8-sulfo-6-vinyl-sulfonylnaphth-2-yl | 4- | phenyl | bluish-red (507) |
| 35 | 6-sulfo-8-vinyl-sulfonylnaphth-2-yl- | 4- | phenyl | bluish-red |
| 36 | 4-(β-sulfatoethyl-sulfonylmethyl)phenyl | 3- | phenyl | red (503) |
| 37 | 3-(β-sulfatoethyl-sulfonylmethyl)phenyl | 3- | phenyl | red (501) |
| 38 | 3-(β-sulfatoethyl-sulfonylmethyl)phenyl | 4- | phenyl | red |
| 39 | 4-(β-sulfatoethyl-sulfonylmethyl)phenyl | 4- | phenyl | red |
| 40 | 4-(vinylsulfonyl-methyl)phenyl | 3- | phenyl | red |
| 41 | 3-(vinylsulfonyl-methyl)phenyl | 3- | phenyl | red (503) |
| 42 | 3-[N-methyl-N-vinyl-sulfonyl]aminophenyl | 3- | phenyl | red (507) |
| 43 | 4-[N-methyl-N-vinyl-sulfonyl]aminophenyl | 3- | phenyl | red (510) |
| 44 | 4-(β-sulfatoethyl-sulfonyl)phenyl | 3- | phenethyl | red (506) |
| 45 | 4-[N-methyl-N-(β-sulfatoethyl-sulfonyl)]aminophenyl | 3- | phenyl | red (504) |
| 46 | 3-[N-methyl-N-(β-sulfatoethyl-sulfonyl)]aminophenyl | 3- | phenyl | red |
| 47 | 3-[N-methyl-N-(β-sulfatoethyl-sulfonyl)]aminophenyl | 4- | phenyl | red |
| 48 | 4-[N-methyl-N-(β-sulfatoethyl-sulfonyl)]aminophenyl | 4- | phenyl | red |
| 49 | 2-methoxy-5-(β-sulfatoethyl-sulfonyl)phenyl | 3- | 4-methyl-phenyl | red (510) |
| 50 | 2-methoxy-4-(β-sulfatoethyl-sulfonyl)phenyl | 3- | 4-methyl-phenyl | red |
| 51 | 2-methoxy-5-methyl-4-(β-sulfatoethyl- | 3- | 4-methyl-phenyl | bluish-red (515) |

-continued

| Ex. | Radical D' | —SO₃H group in ... - position | Radical R | Shade |
|---|---|---|---|---|
| 52 | 4-methoxy-3-(β-sulfatoethylsulfonyl)phenyl | 3- | 4-methylphenyl | bluish-red |
| 53 | 2,5-dimethoxy-4-(β-sulfatoethylsulfonyl)phenyl | 3- | 4-methylphenyl | bluish-red (524) |
| 54 | 1-sulfo-6-(β-sulfatoethylsulfonyl)naphth-2-yl | 3- | 4-methylphenyl | bluish-red |
| 55 | 1-sulfo-6-(β-sulfatoethylsulfonyl)naphth-2-yl | 3- | 4-sulfophenyl | bluish-red (514) |
| 56 | 3-(β-sulfatoethylsulfonyl)phenyl | 3- | 4-sulfophenyl | red |
| 57 | 4-(β-sulfatoethylsulfonyl)phenyl | 3- | 4-sulfophenyl | red |
| 58 | 4-(β-sulfatoethylsulfonyl)phenyl | 4- | 4-sulfophenyl | red |
| 59 | 4-(β-sulfatoethylsulfonyl)phenyl | 3- | 4-methylphenyl | red |
| 60 | 4-vinylsulfonylphenyl | 3- | 4-sulfophenyl | red |
| 61 | 3-vinylsulfonylphenyl | 3- | 4-sulfophenyl | red |
| 62 | 3-(β-sulfatoethylsulfonyl)phenyl | 3- | 2-carboxyphenyl | red (506) |
| 63 | 3-(β-sulfatoethylsulfonyl)phenyl | 4- | 2-carboxyphenyl | red |
| 64 | 4-(β-sulfatoethylsulfonyl)phenyl | 4- | 2-carboxyphenyl | red (507) |
| 65 | 4-(β-sulfatoethylsulfonyl)phenyl | 3- | 2-carboxyphenyl | red |
| 66 | 4-vinylsulfonylphenyl | 3- | 2-carboxyphenyl | red |
| 67 | 4-vinylsulfonylphenyl | 3- | 4-carboxyphenyl | red |
| 68 | 4-vinylsulfonylphenyl | 4- | 4-carboxyphenyl | red |
| 69 | 4-(β-sulfatoethylsulfonyl)phenyl | 3- | 4-carboxyphenyl | red (504) |
| 70 | 4-(β-sulfatoethylsulfonyl)phenyl | 4- | 4-carboxyphenyl | red |
| 71 | 3-(β-sulfatoethylsulfonyl)phenyl | 3- | 4-carboxyphenyl | red |
| 72 | 3-(β-sulfatoethylsulfonyl)phenyl | 4- | 4-carboxyphenyl | red |
| 73 | 1-sulfo-6-(β-sulfatoethylsulfonyl)naphth-2-yl | 3- | 4-carboxyphenyl | bluish-red |
| 74 | 1-sulfo-6-vinylsulfonylnaphth-2-yl | 3- | 4-carboxyphenyl | bluish-red |
| 75 | 1-sulfo-6-vinylsulfonylnaphth-2-yl | 3- | benzyl | bluish-red |
| 76 | 1-sulfo-6-(β-sulfatoethylsulfonyl)naphth-2-yl | | benzyl | bluish-red |
| 77 | 3-(β-sulfatoethylsulfonyl)phenyl | 3- | benzyl | red (500) |
| 78 | 4-(β-sulfatoethylsulfonyl)phenyl | 3- | benzyl | red |
| 79 | 2-methoxy-5-(β-sulfatoethylsulfonyl)phenyl | 3- | benzyl | red (509) |
| 80 | 2-methoxy-5-methyl-4-(β-sulfatoethylsulfonyl)phenyl | 3- | benzyl | bluish-red (517) |
| 81 | 2,5-dimethoxy-4-(β-sulfatoethylsulfonyl)phenyl | 3- | benzyl | bluish-red (524) |
| 82 | 4-(β-sulfatoethylsulfonyl)phenyl | 3- | 3-hydroxyphenyl | red (508) |
| 83 | 3-(β-sulfatoethylsulfonyl)phenyl | 3- | 3-hydroxyphenyl | red |
| 84 | 3-(β-sulfatoethylsulfonyl)phenyl | 3- | phenethyl | red (501) |
| 85 | 3-(β-sulfatoethylsulfonyl)phenyl | 3- | 4-methylphenyl | red |
| 86 | 1-sulfo-6-vinylsulfonylnaphth-2-yl | 4- | phenyl | bluish-red |
| 87 | 2-sulfo-5-vinylsulfonylphenyl | 4- | phenyl | bluish-red |
| 88 | 2-sulfo-4-vinylsulfonylphenyl | 4- | phenyl | bluish-red |

What is claimed is:

1. An azo compound of general formula (1)

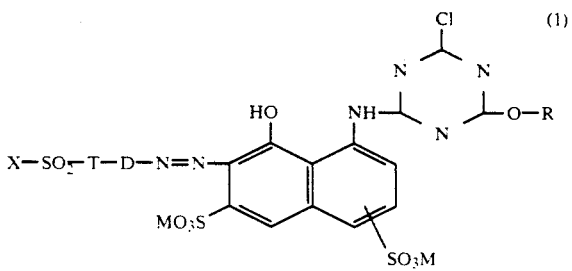

in which
X is vinyl or β-sulfatoethyl;
T is a direct bond,
D is phenylene unsubstituted or substituted by 1 or 2 substituents from the group consisting of alkyl having 1 to 4 carbons, alkoxy having 1 to 4 carbons, or is a naphthylene unsubstituted or substituted by a sulfo (—SO₃M) group,
R is a phenyl unsubstituted or substituted by carboxy and sulfo (—SO₃—), or is alkyl having 1 to 4 carbons which is substituted by a phenyl or a naphthyl both being unsubstituted or substituted by 1 or 2 sulfo (—SO₃M) groups;
M is a hydrogen or an alkali metal; and
the group —SO₃M in the amino-naphthol moiety is bonded in the metal or para position relative to the amino group.

2. A compound as claimed in claim 1, wherein D is metaphenylene or paraphenylene or 1-sulfo-2,6-naphthylene with the azo group bonded to its 2-position.

3. A compound as claimed in claim 1, wherein one of the sulfo groups —SO₃M in the aminonaphthol coupling radical is bonded in the meta position relative to the amino group.

4. A compound as claimed in claim 1, wherein R is phenyl.

5. A compound as claimed in claim 1, wherein X is β-sulfatoethyl.

6. A compound as claimed in claim 2, wherein one of the sulfo groups —SO₃M in the aminonaphthol coupling radical is bonded in the meta position relative to the amino group.

7. A compound as claimed in claim 2, wherein R is phenyl.

8. A compound as claimed in claim 3, wherein R is phenyl.

9. A compound as claimed in claim 2, wherein X is β-sulfatoethyl.

10. A compound as claimed in claim 3, wherein X is β-sulfatoethyl.

11. A compound as claimed in claim 4, wherein X is β-sulfatoethyl.

* * * * *

UNITED STATES PATENT AND TRADEMARK OFFICE
CERTIFICATE OF CORRECTION

PATENT NO. : 5,175,263
DATED : December 29, 1992
INVENTOR(S) : Schlafer, et. al.

It is certified that error appears in the above-identified patent and that said Letters Patent is hereby corrected as shown below:

Col. 14, In claim 1, lines 15-25, please delete the formula and insert the following formula:

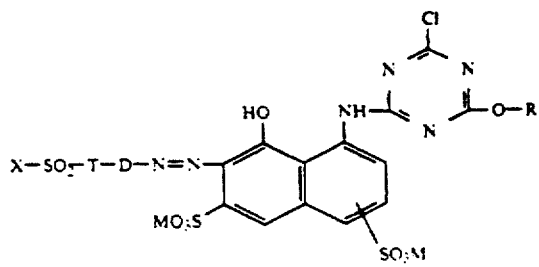

In column 14, line 37, please delete "(-SO$_3$-)" and insert -- (-SO$_3$M) --.

Signed and Sealed this

Thirtieth Day of November, 1993

*Attest:*

BRUCE LEHMAN

*Attesting Officer*  Commissioner of Patents and Trademarks